United States Patent [19]

Hashiuchi et al.

[11] Patent Number: 5,556,571

[45] Date of Patent: Sep. 17, 1996

[54] MAGNETITE PARTICLES AND PROCESS FOR PREPARING THE SAME

[75] Inventors: Masachika Hashiuchi; Takeshi Miyazono; Hiroyuki Watanabe; Tadashi Yamanishi, all of Tamano, Japan

[73] Assignee: Mitsui Mining & Smelting Co., Ltd., Okayama, Japan

[21] Appl. No.: 511,262

[22] Filed: Aug. 4, 1995

[30] Foreign Application Priority Data

Aug. 5, 1994 [JP] Japan .................................. 6-202947
Aug. 5, 1994 [JP] Japan .................................. 6-202948

[51] Int. Cl.$^6$ .............................. H01F 1/11; H01F 1/36
[52] U.S. Cl. ............................... 252/62.56; 252/62.59; 252/62.62; 106/456; 106/457; 106/459; 428/403
[58] Field of Search ............................. 252/62.62, 62.59, 252/62.56; 488/403; 106/456, 457, 459

[56] References Cited

U.S. PATENT DOCUMENTS

| | | | |
|---|---|---|---|
| 4,342,589 | 8/1982 | Ohshima et al. | 252/62.56 |
| 5,041,307 | 8/1991 | Koyama et al. | 252/62.56 |
| 5,124,207 | 6/1992 | Hayashi et al. | 252/62.62 |

*Primary Examiner*—Melissa Bonner
*Attorney, Agent, or Firm*—Morrison Law Firm

[57] ABSTRACT

There are provided magnetite particles characterized in that they have surfaces each covered with a thin film or iron-zinc oxides or further covered thereon with a thin film of iron-silicon oxides and have a saturation magnetization of at least 79 emu/g, a degree of blackness (L) of at most 19.5 as measured with a differential colorimeter, and an absorption of at least 30 ml/100 g as measured according to JIS K 5101. There is also provided a process for preparing magnetite particles as described above.

4 Claims, 2 Drawing Sheets

10nm

MAGNETITE PARTICLES AND PROCESS FOR PREPARING THE SAME

BACKGROUND OF THE INVENTION

1. Field of the Invention

The present invention relates to magnetite particles and more particularly it relates to magnetite particles which have the surfaces thereof covered with iron-zinc oxides, if necessary, further covered with iron-silicon oxides not only to assume a black color but also to make well-balanced improvements in magnetic properties and further make enhancement in dispersibility through an improvement of flowability which is otherwise poor due to agglomeration of the particles and are therefore useful especially as a powdery material for an electrostatic copying magnetic toner and as a black pigment powder for a paint, and also to a process for preparing the same.

2. Prior Art

These days, magnetic magnetite is used in a variety of fields, especially in a magnetic toner for electrostatic copiers. In general, processes for preparing such magnetic magnetite are classified into dry processes and wet processes. In the latter processes, prevalent processes are those wherein an aqueous solution of an alkali is added to an aqueous solution containing ferrous ions to effect an oxidation reaction under specific conditions.

In connection with these wet processes, for the purpose of improving various properties of powder such as magnetite particles, there have been proposed several kinds of magnetite particles containing zinc and processes for preparing the same. Typical of the proposed processes is a process as disclosed in Japanese Patent Publication Gazette No. 43,408/84. This process is one wherein spinel type iron oxide is obtained by adding an aqueous solution of an alkali to a ferrous salt, then effecting oxidation off the resulting mixture until a ratio of bivalent Fe to total Fe in the aqueous solution comes to fall within a specific range, subsequently adding a water-soluble zinc compound in such an amount as to provide a specific Zn/Fe ratio and then effecting a reaction at a specific free hydroxyl group ion concentration and at a specific solution temperature. The particles obtained according to this process are stated in said Gazette to have the features that "they assume a perfect (nonbrownish) black color and have a coercive force of about 100 to 200 Oe." Although these particles have reasonable properties, their saturation magnetization and the like are far from sufficient and they are very large in particle size, thus raising such a problem as to the quality of the resulting magnetic toner, especially as to the fact that the particles, particularly when dispersed in the toner, give thereto adverse effects such as excessive protrusion thereof from the surfaces of the toner and maldistribution thereof in the toner.

On the other hand, for the purpose of improving various properties of powder such as magnetite particles, there have also been proposed some kinds of magnetite particles containing a silicon component and processes for preparing the same, representative examples of which are magnetite particles and processes for preparing the same as disclosed in Japanese Patent Laid-Open Gazette No. 139,544/79, Japanese Patent Laid-Open Gazette No. 278,131/87, Japanese Patent Publication Gazette No. 9,045/91, etc.

Among the Gazettes so listed, Japanese Patent Laid-Open Gazette No. 139,544/79 discloses magnetic particles prepared by diluting fine particles of silicon oxide, a silicone oil and the like with an organic solvent to prepare a slurry and then effecting a treatment of bonding the original magnetic particles with the slurry. These particles involve a problem of uniformity of the silicon component on the particles because the treatment is a mechanical means.

On the other hand, Japanese Patent Laid-Open Gazette No. 278,131 discloses magnetic iron oxide containing silicon element, characterized in that the proportion of the silicon element present in the magnetic iron oxide is 0.1 to 1.5 wt. % based on the iron element, and in that the silicon element content present in an eluted iron element of the magnetic iron oxide when a rate of iron element eluted therefrom reaches up to about 10 wt. % is at most about 0.7 wt. % and the silicon element content present in an eluted iron element of the magnetic iron oxide when a rate of iron element eluted therefrom reaches between about 90 wt. % and 100 wt. % is about 0.2 to 5 wt. %, with a proviso that the ratio between the former and the latter is at least 1.0. Since the silicon content present in these particles between their surfaces and their 10% insides from their surfaces is only about 0.2% in terms of Si/Fe molar ratio when calculated based on the total amount of the particles, thus these particles still raising a problem of powder flowability.

On the other hand, Japanese Patent Publication No. 9,045/91 discloses particles prepared according to a procedure comprising preliminarily adding a water-soluble silicate in an amount of 0.1 to 5.0 atomic % in terms of Si based on Fe to either an aqueous solution of a ferrous salt containing a ferrous hydroxide colloid or an alkali hydroxide before the ferrous salt solution and the alkali hydroxide are reacted together. Since the silicate is added before the reaction, however, the resulting particles are notably low in silicon content in the proximity of the surfaces of the particles, this raising a problem of powder flowability.

SUMMARY OF THE INVENTION

An object of the present invention is to solve these problems of prior art thereby to provide magnetite particles having excellent oil-absorbing properties, having made well-balanced improvements in magnetic properties, having solved a problem of poor flowability due to agglomeration thereof as involved particularly in the case of magnetite particles having a small particle size and keeping the degree of blackness of the particles unimpaired, despite the comparatively small particle size of the particles with a BET specific surface area of at least 7 $m^2/g$, and the object is also to provide a process for preparing the magnetite particles.

As a result of intensive investigations with a view to attaining the foregoing object, the inventors of the present invention have concluded that magnetite particles as disclosed in the aforementioned Japanese Patent Publication No. 43,408/84 undergo only a minimum of influences on the degree of blackness thereof and can be improved in magnetic properties with a good balance when a ferrous salt containing zinc is added in such an amount as to provide a Zn/Fe molar ratio (%) of 0.2 to 1.8% to magnetite particles at the time of completion of a first oxidation reaction, then a second oxidation reaction is allowed to proceed, subsequently a ferrous salt containing a silicate is added in such an amount as to provide an Si/Fe molar ratio (%) of 0.4 to 2.0% to the magnetite particles at the time of completion of the second oxidation reaction, and a third oxidation reaction is further allowed to proceed.

More specifically, the process for preparing magnetite particles according to the present invention comprises mixing a solution of a ferrous salt as the main component with an aqueous solution of an alkali in an amount at least equivalent to that of iron, and then effecting a first oxidation reaction while keeping the residual sodium hydroxide concentration of the reaction solution at a level of 1 to 3 g/l to complete the first oxidation reaction, subsequently adding a Ferrous salt containing zinc in such an amount as to provide a Zn/Fe molar ratio (%) of 0.2 to 1.84% based on the whole magnetite particles, adjusting the pH of the reaction solution to 6.0 to 9.0 and then effecting a second oxidation reaction.

Further, according to the present invention, a ferrous salt containing a silicate may successively be added in such an amount as to provide an Si/Fe molar ratio (%) of 0.4 to 2.0% in the whole magnetite particles to the reaction solution after the completion of the second oxidation reaction, followed by adjusting the pit of the reaction solution to 6.0 to 9.0 and then effecting a third oxidation reaction. Effecting such a third oxidation reaction can improve the resulting magnetite particles in flowability which is otherwise poor due to agglomeration thereof as involved in the case of magnetite particles having a small particle size.

The process of the present invention will now be described in more detail.

In the present invention, a solution of a ferrous salt as the main component is first mixed with an aqueous solution of an alkali in an amount at least equivalent to that of iron to form ferrous hydroxide. The aqueous solution of the ferrous salt as the main component includes a solution of ferrous sulfate. On the other hand, the aqueous solution of the alkali includes an aqueous solution of sodium hydroxide.

After the formation of ferrous hydroxide by mixing the solution of the ferrous salt as the main component with the aqueous solution of the alkali, an oxygen-containing gas, desirably air, is blown into the ferrous hydroxide to effect the first oxidation reaction at 60° to 100° C., preferably at 80° to 90° C. In this step, the degree of the oxidation reaction is controlled by controlling the amount of the oxygen-containing gas being blown while observing the analytical value of unreacted ferrous hydroxide during the course of the reaction. In this oxidation reaction, attention is paid to the progress thereof so that the residual sodium hydroxide concentration of the reaction solution becomes 1 to 3 g/l.

After the reaction is allowed to proceed from the beginning of the reaction until the amount of unreacted ferrous hydroxide becomes substantially zero, the ferrous salt containing zinc ions is added in such an amount as to provide a Zn/Fe molar ratio (%) of 0.2 to 1.8%, preferably 0.3 to 1.2%, to the magnetite particles, followed by effecting the second oxidation reaction.

When the Zn/Fe molar ratio in the magnetite particles is lower than 0.2%, the magnetic properties thereof such as the saturation magnetization thereof in particular are lowered because the particles are of a comparatively small size when the BET specific surface area is at least 7.0 m²/g. On the other hand, when the Zn/Fe molar ratio (%) in the magnetite particles exceeds 1.8%, the saturation magnetization thereof is lowered due to disarrangement of the Zn distribution in the particles and the degree of blackness thereof is notably lost due to formation of thick $ZnOFe_2O_3$ layers, as disclosed in the aforementioned Japanese Patent Publication Gazette No. 43,408/84, on the surfaces of the particles.

Further, it is desirable that the Zn/Fe molar ratio (%) in iron-zinc oxides formed on the surfaces of the particles be controlled to be preferably 7 to 50%, further preferably 10 to 40%. When the Zn/Fe molar ratio (%) in the iron-zinc oxides is lower than 7% zinc in the iron-zinc oxides is unfavorably maldistributed on the surfaces of the particles. On the other hand, when it exceeds 50%, zinc in $ZnOFe_2O_3$ is excessively exposed on the surfaces of the particles to lower the degree of blackness thereof.

On the other hand, according to the present invention, the pit during the progress of the second oxidation reaction after the addition of the ferrous salt containing zinc may be controlled to be 6.0 to 9.0, preferably 8.0 to 9.0. When the pH is lower than 6.0, there is a possibility of goethite particles being formed in the reaction mixture slurry. On the other hand, when the pit exceeds 9.0, superfluous addition of an additional alkali is necessary, this being uneconomic though there arise no differences in the properties of particles.

After the completion of the second oxidation reaction, the common steps of washing, filtration, drying, and pulverization are further taken to obtain magnetite particles.

The magnetite particles thus obtained, which have surfaces each covered with a thin film of the iron-zinc oxides, have a saturation magnetization of at least 79 emu/g, a degree of blackness (L) of at most 19.5 as measured with a differential colorimeter, and an oil absorption of at least 30 ml/100 g as measured according to JIS K 5101.

Further, according to the present invention, the ferrous salt containing the silicate may subsequently be added to the slurry of the magnetite particles having thin films of iron-zinc oxides formed on the surfaces thereof as a result of the completion of the second oxidation reaction to effect the third oxidation reaction while adjusting the pH of the slurry to 6.0 to 9.0. As a result, magnetite containing silicic acid is disposed on the surfaces of the particles to attain an improvement in flowability which is otherwise poor due to agglomeration thereof as involved particularly in the case of magnetite particles having a small particle size. The Si/Fe molar ratio (%) in the magnetite particles may be 0.4 to 2.0%, preferably 0.6 to 1.4%. When the Si/Fe molar ratio (%) is lower than 0.4%, the effect of improving the flowability is low. On the other hand, when the Si/Fe molar ratio (%) exceeds 2.0%, a filter cloth is clogged in the step of washing with water to make the workability thereof poor though the flowability of the particles is improved. Further, when the amount of silicon is superfluous for the effect thereof on the Flowability, an increase in the consumption of silicon provides a poor economy. Furthermore, an increase in the amount of silicon used tends to lower the saturation magnetization of the magnetite particles.

The pH during the progress of the third oxidation reaction after the addition of the ferrous salt containing the silicate may be controlled to be 6.0 to 9.0, preferably 8.0 to 9.0. The reason for selection of this range of pit is the same as that during the progress of the second oxidation reaction after the addition of the ferrous salt containing zinc.

After the completion of the third oxidation reaction, the common steps of washing, filtration, drying, and pulverization are further taken to obtain magnetite particles.

The magnetite particles thus obtained, which have the surfaces thereof each covered with a thin film of the iron-zinc oxides and further covered thereon with a thin film of iron-silicon oxides, have a saturation magnetization of at least 79 emu/g, a degree of blackness of at most 19.5 as measured with a differential colorimeter, an oil absorption of at least 30 ml/100 g as measured according to JIS K 5101, and a spatula angle of at most 60°.

Additionally stated, the portions expressed as "surfaces" in the present invention refer to those ranging from the surfaces of magnetite particles first obtained using the ferrous salt and the aqueous solution of the alkali to the surfaces of thin magnetite films bonded to the surfaces of magnetite particles and formed thereon till the completion of the second and third oxidation reactions effected after the addition of the ferrous salt containing zinc and the ferrous salt containing the silicate, respectively.

Accordingly, the feature of the present invention which is that the surfaces or surface portions are formed after the reaction for formation of magnetite particles as a base is once ended to substantially determine the size of the resulting magnetite particles, is utterly unlike the process (described in the aforementioned Japanese Patent Publication Gazette No. 43,408/84) which comprises adding a water-soluble zinc compound in the course of the reaction when a considerable amount of unreacted Ferrous hydroxide still remains. The reason for taking such a featured procedure is that a decrease in the degree of blackness of the magnetite particles is minimized, while making well-balanced improvements in the magnetic properties thereof and securing good flowability thereof.

DESCRIPTION OF THE PREFERRED EMBODIMENTS

The present invention will now be specifically illustrated by Examples, etc.

EXAMPLE 1

65 liters of an aqueous solution of ferrous sulfate containing 1.54 mol/l of $Fe^{2+}$ were mixed with 88 liters of an aqueous solution of 2.38 mol/l of sodium hydroxide, followed by stirring.

After the residual sodium hydroxide concentration of the mixed aqueous solution was adjusted to 2.1 g/l, 65 l/min of air were blown into the reaction solution while keeping the temperature thereof at 80° C. to once end the reaction (first-stage oxidation reaction) thereby to obtain a reaction mixture slurry.

Subsequently, 2.25 liters of a mixed aqueous solution separately prepared by adding zinc sulfate to an aqueous solution of ferrous sulfate containing 1.27 mol/l of $Fe^{2+}$ in such a manner as to obtain 0.5 mol/l of $Zn^{2+}$, were added to said reaction mixture slurry, after which 40 l/min of air were blown again into the resulting mixture to complete the reaction.

The resulting particles were subjected to the common steps of washing, filtration, drying and pulverization.

The specific surface area, magnetic properties, oil absorption and color of magnetite particles thus obtained were measured according to the following methods. The results are shown in Table 2.

(Measuring Methods)

(1) Specific Surface Area

Use was made of a BET meter Model 2200 manufactured by Shimadzu-Micromeritics Corporation.

(2) Magnetic Properties

A magnetometer Model VSM-P7 of a sample vibration type manufactured by Toei Kogyo K.K. was used to measure the saturation magnetization at 10 kOe.

(3) Colorimetry 0.5 g of the magnetite particles and 0.7 g off linseed oil were kneaded with a Hoover muller. 4.5 g of a clear lacquer were added to the resulting mixture and then further well kneaded. The resulting mixture so well kneaded was applied on mirror coated paper with a 4 mil applicator, dried and then subjected to colorimetry with a differential colorimeter.

(4) Oil Absorption

According to a JIS method (JIS K 5101, pigment testing method).

(5) Rate of Zn Eluted

Figure 1:
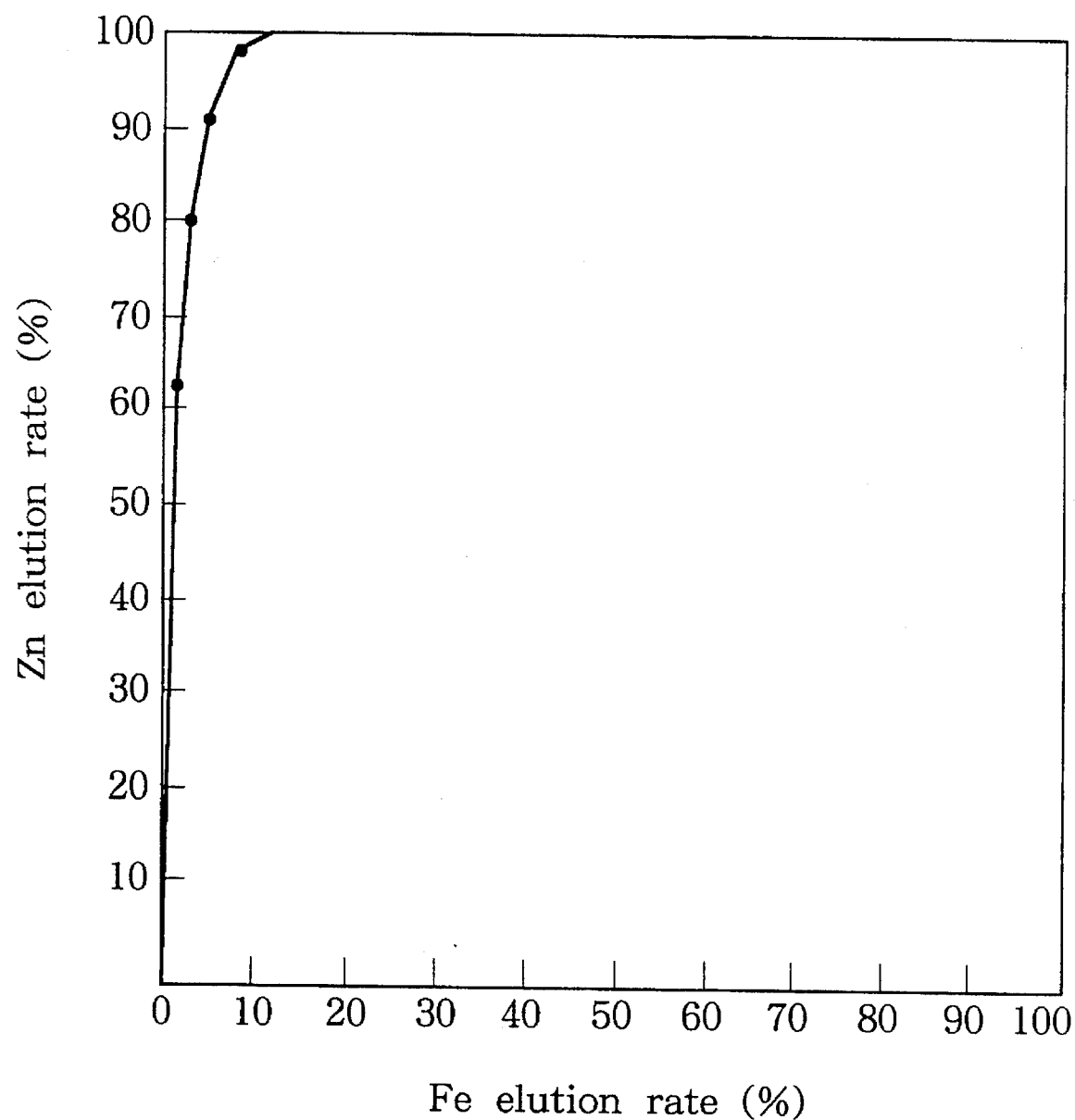
FIG. 1 is a graph showing the relationship between a rate of zinc eluted and a rate of iron eluted for magnetite particles in Example 1.

The relationship between the rate of zinc eluted and the rate of iron eluted of the particles obtained was determined according to the following procedure. 25 g of a sample were put into and dissolved in 5 liters of 1N hydrochloric acid with stirring at 50° C. The resulting solution was filtered with a 0.1 µm membrane to separate the filtrate, from which the rates of zinc and iron eluted every hour were found with an inductively coupled plasma (ICP). The results are shown in Table 3 and FIG. 1.

It was confirmed from these results that zinc was eluted in an early stage, so that zinc existed only on the surfaces of the magnetite particles.

Figure 2:
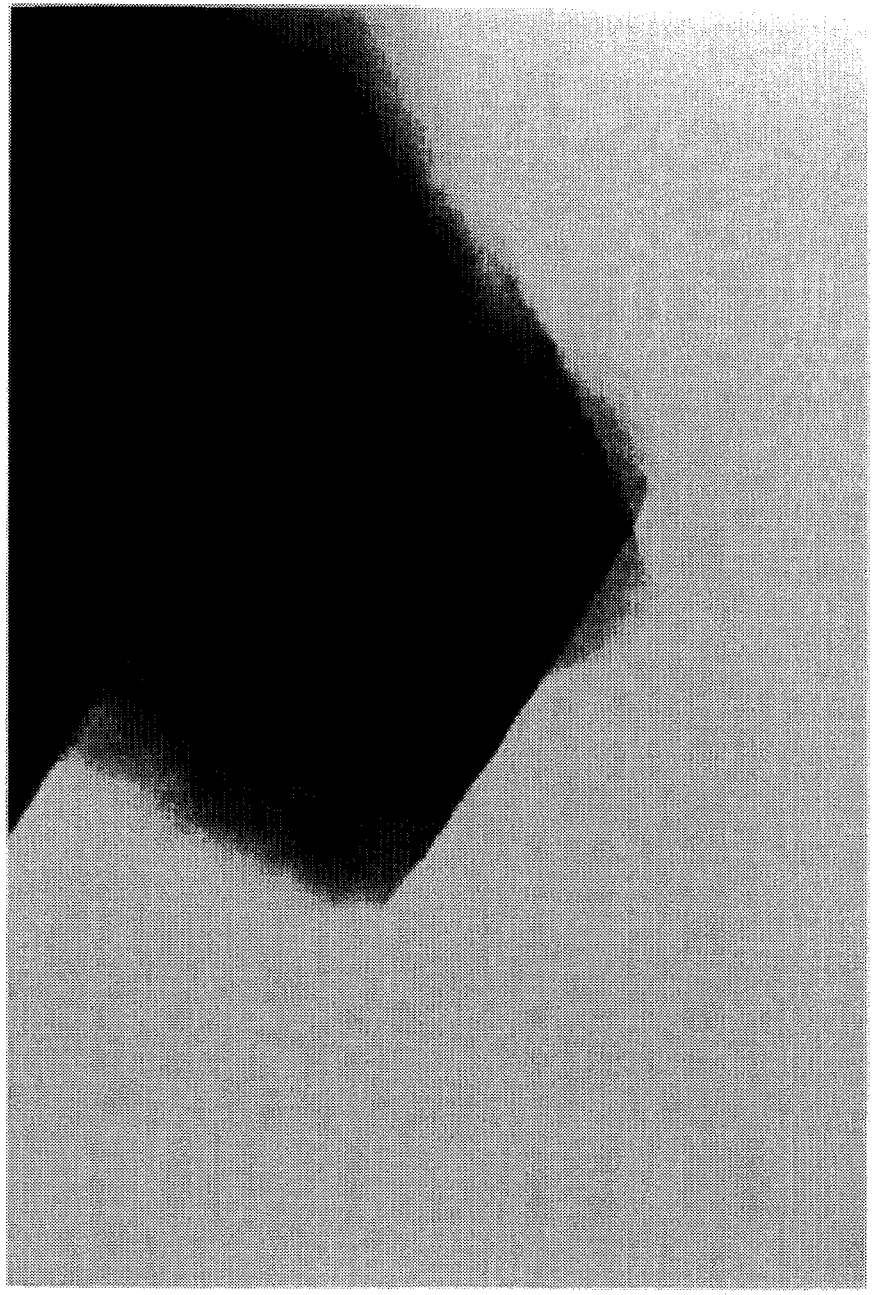
FIG. 2 is a transmission electron microscope photograph (×2,000,000) showing the particle structure of a magnetite particle in Example 1.

Further, FIG. 2 shows a transmission electron microscope photograph (×2,000,000) showing the particle structure of such a magnetite particle. It is understandable from FIG. 2 that iron-zinc oxides were formed on the surface of the magnetite particle.

EXAMPLES 2 AND 3 AND COMPARATIVE EXAMPLES 1 TO 3

The procedure of Example 1 was followed except that the ferrous sulfate and zinc sulfate concentrations of the mixed aqueous solution of ferrous sulfate and zinc sulfate added after the end of the first-stage oxidation reaction were substituted by those shown in Table 1. On the other hand, in Comparative Example 1, no aqueous solution of ferrous sulfate and zinc sulfate was added after the end of the first-stage oxidation reaction. The specific surface area, magnetic properties, oil absorption and color of magnetite particles obtained in each of Examples and Comparative Examples were measured in the same manner as in Example 1. The results are shown in Table 2.

As is apparent from the results in Table 2, the saturation magnetizations ($\sigma_s$) in Examples 1 to 3 were at a high level as compared with those in Comparative Example 1 to 3.

EXAMPLE 4 AND COMPARATIVE EXAMPLE 4

The procedure of Example 1 was followed except that the amount (l) of the aqueous solution of an alkali (aqueous solution of sodium hydroxide) as well as the concentrations (mol/l) of aqueous solutions of ferrous sulfate and zinc sulfate used before the reaction was varied as shown in Table 1 in order to control the size of particles (Example 4).

The procedure of Comparative Example 1 was followed except that amount (l) of the aqueous solution of an alkali (aqueous solution of sodium hydroxide) used before the reaction was varied as shown in Table 1 in order to control the size of particles (Comparative Example 4).

The specific surface area, magnetic properties, oil absorption and color of the magnetite particles obtained in each of Example 4 and Comparative Example 4 were measured in the same manner as in Example 1. The results are shown in Table 2.

In comparison of Example 4 with Comparative Example 4 as shown in Table 2, the saturation magnetization in Example 4 is higher than that in Comparative Example 4.

COMPARATIVE EXAMPLE 5

Magnetite particles were prepared according to the method as disclosed in Example 1 of Japanese Patent Publication Gazette No. 43,408/84.

The specific surface area, magnetic properties, oil absorption and color of the magnetite particles of Comparative Example 5 were measured in the same manner as in Example 1. The results are shown in Table 2.

The magnetite particles of Comparative Example 5 exhibited a low L value when measured according to colorimetry and were hence excellent in the degree of blackness, but notably low in saturation magnetization for the size of the particles.

TABLE 3

| Elution Time (min) | 10 | 20 | 30 | 45 | 60 | 90 | 120 | 240 |
|---|---|---|---|---|---|---|---|---|
| Rate of Fe Eluted (%) | 0.5 | 1.8 | 3.4 | 6.6 | 9.7 | 17.7 | 25.5 | 100 |
| Rate of Zn Eluted (%) | 62.2 | 80.0 | 91.1 | 98.0 | 100 | 100 | 100 | 100 |

EXAMPLE 5

65 liters of an aqueous solution of Ferrous sulfate containing 1.54 mol/l of $Fe^{2+}$ were mixed with 88 liters of an aqueous solution of 2.38 mol/l of sodium hydroxide, Followed by stirring.

After the residual sodium hydroxide concentration of the mixed aqueous solution was adjusted to 2.1 g/l, then 30 l/min of air was blown into the reaction solution while keeping the temperature thereof at 80° C. to once end a first oxidation reaction thereby to obtain a reaction mixture slurry.

Subsequently, 2.25 liters of a mixed aqueous solution separately prepared by adding zinc sulfate to an aqueous solution of ferrous sulfate containing 1.27 mol/l of $Fe^{2+}$ in such a manner as to obtain a $Zn^{2+}$ concentration of 0.5 mol/l, were added to the resulting reaction mixture slurry, into which 15 l/min of air were blown again to complete a second oxidation reaction.

Subsequently, 2.3 liters of an aqueous solution separately prepared by adding sodium silicate (Grade No.3) to an aqueous solution of ferrous sulfate containing 1.01 mol/l of $Fe^{2+}$ in such a manner as to obtain a concentration of 0.44 mol/l of $Si^{4+}$, were added to said resulting reaction mixture slurry, into which 15 l/min of air were blown again to complete a third oxidation reaction.

The resulting particles were subjected to the common steps of washing, filtration, drying, and pulverization.

The specific surface area, magnetic properties, color (according to colorimetry with a differential colorimeter) and oil absorption of magnetite particles thus obtained were measured in the same manner as in Example 1, while the powder flowability thereof was measured according to the following method. The results are shown in Table 5.

(Powder Flowability)

Use was made of a powder tester manufactured S by Hosokawa Micron Corp. A sample powder was heaped up

TABLE 1

| Ex. and Comp. Ex. | Aqueous Solution of Ferrous Sulfate | | Aqueous Solution of Sodium Hydroxide | | Residual NaOH Concentration of Mixed Aqueous Solution (g/l) | Mixed Aqueous Solution of Ferrous Sulfate + Zinc Sulfate | | | Zn/Fe Molar Ratio in Magnetite Particles (%) |
|---|---|---|---|---|---|---|---|---|---|
| | Concentration (mol/l) | Amount (l) | Concentration (mol/l) | Amount (l) | | Ferrous Sulfate Concentration (mol/l) | Zinc Sulfate Concentration (mol/l) | Amount (l) | |
| Ex. 1 | 1.54 | 65 | 2.38 | 88 | 2.1 | 1.27 | 0.50 | 2.25 | 1.10 |
| Ex. 2 | 1.54 | 65 | 2.38 | 88 | 2.1 | 0.64 | 0.24 | 2.25 | 0.54 |
| Ex. 3 | 1.54 | 65 | 2.38 | 88 | 2.1 | 1.98 | 0.79 | 2.25 | 1.70 |
| Ex. 4 | 1.54 | 65 | 2.38 | 89 | 2.8 | 0.28 | 0.11 | 2.25 | 0.25 |
| Comp. Ex. 1 | 1.54 | 65 | 2.38 | 88 | 2.1 | — | — | — | — |
| Comp. Ex. 2 | 1.54 | 65 | 2.38 | 88 | 2.1 | 0.21 | 0.08 | 2.25 | 0.18 |
| Comp. Ex. 3 | 1.54 | 65 | 2.38 | 88 | 2.1 | 2.80 | 1.12 | 2.25 | 2.37 |
| Comp. Ex. 4 | 1.54 | 65 | 2.38 | 89 | 2.8 | — | — | — | — |
| Comp. Ex. 5 | 1.54 | 65 | 2.38 | 124 | 20.0 | — | 6.50 | 2.25 | 15.00 |

TABLE 2

| Ex. and Comp. Ex. | Specific Surface Area ($m^2$/g) | Results of Colorimetry | | | Magnetic Properties (10 kOe) $\sigma_s$ (emu/g) | Oil Absorption (ml/100 g) |
|---|---|---|---|---|---|---|
| | | L | a | b | | |
| Ex. 1 | 19.9 | 19.2 | −0.4 | −0.9 | 79.3 | 35 |
| Ex. 2 | 19.2 | 19.2 | −0.2 | −1.2 | 80.4 | 33 |
| Ex. 3 | 20.7 | 18.9 | −0.3 | −0.8 | 79.2 | 34 |
| Ex. 4 | 7.9 | 16.3 | −0.3 | −0.2 | 83.5 | 32 |
| Comp. Ex. 1 | 19.5 | 19.6 | −0.1 | −0.7 | 75.3 | 36 |
| Comp. Ex. 2 | 20.5 | 19.8 | −0.1 | −0.8 | 75.4 | 37 |
| Comp. Ex. 3 | 19.1 | 18.3 | −0.3 | −0.7 | 78.0 | 30 |
| Comp. Ex. 4 | 7.9 | 16.7 | −0.3 | −0.9 | 82.8 | 29 |
| Comp. Ex. 5 | 7.1 | 13.1 | 0.0 | 0.7 | 73.4 | 24 | on a spatula (pan). The spatula angle was measured according to an operation procedure including the measurement of the angle of inclination of the side face of the heaped-up powder.

EXAMPLE 6 TO 10

The procedure of Example 5 was followed except that the ferrous sulfate and zinc sulfate concentrations of the mixed aqueous solution of Ferrous sulfate and zinc sulfate added before the second oxidation reaction, and the ferrous sulfate and sodium silicate concentrations of the mixed aqueous solution of ferrous sulfate and sodium silicate added before the third oxidation reaction, were substituted by those shown in Table 4. The specific surface area, magnetic properties, color, oil absorption and powder flowability of magnetite particles obtained in each of Examples were measured in the same manner as in Example 5. The results are shown in Table 5.

TABLE 4

| Ex. and Comp. Ex. | Aqueous Solution of Ferrous Sulfate | | Aqueous Solution of Sodium Hydroxide | | Mixed Aqueous Solution of Ferrous Sulfate + Zinc Sulfate | | |
|---|---|---|---|---|---|---|---|
| | | | | | Ferrous Sulfate | Zinc Sulfate | |
| | Concentration (mol/l) | Amount (l) | Concentration (mol/l) | Amount (l) | Concentration (mol/l) | Concentration (mol/l) | Amount (l) |
| Ex. 5 | 1.54 | 65 | 2.38 | 88 | 1.27 | 0.50 | 2.25 |
| Ex. 6 | 1.54 | 65 | 2.38 | 88 | 1.27 | 0.50 | 2.25 |
| Ex. 7 | 1.54 | 65 | 2.38 | 88 | 1.27 | 0.50 | 2.25 |
| Ex. 8 | 1.54 | 65 | 2.38 | 88 | 0.64 | 0.24 | 2.25 |
| Ex. 9 | 1.54 | 65 | 2.38 | 88 | 0.98 | 0.79 | 2.25 |
| Ex. 10 | 1.54 | 65 | 2.38 | 88 | 0.28 | 0.11 | 2.25 |

| Ex. and Comp. Ex. | Mixed Aqueous Solution of Ferrous Sulfate + Sodium Silicate | | | Zn/Fe Molar Ratio in Magnetic Particles (%) | Si/Fe Molar Ratio in Magnetite Particles (%) |
|---|---|---|---|---|---|
| | Ferrous Sulfate Concentration (mol/l) | Sodium Silicate Concentration (mol/l) | Amount (l) | | |
| Ex. 5 | 1.01 | 0.44 | 2.3 | 1.07 | 0.95 |
| Ex. 6 | 1.01 | 0.88 | 2.3 | 1.07 | 1.85 |
| Ex. 7 | 1.01 | 0.22 | 2.3 | 1.07 | 0.48 |
| Ex. 8 | 1.01 | 0.44 | 2.3 | 0.52 | 0.96 |
| Ex. 9 | 1.01 | 0.44 | 2.3 | 1.70 | 0.96 |
| Ex. 10 | 1.01 | 0.44 | 2.3 | 0.24 | 0.97 |

TABLE 5

| Ex. & Comp. Ex. | Specific Surface Area ($m^2/g$) | Results of Colorimetry | | | Magnetic Properties (10 kOe) $\sigma_S$ (emu/g) | Oil Absorption (ml/100 g) | Flowability Spatula Angle (°) |
|---|---|---|---|---|---|---|---|
| | | L | a | b | | | |
| Ex. 5 | 20.7 | 18.3 | −0.4 | −0.5 | 80.4 | 38 | 57 |
| Ex. 6 | 22.5 | 17.5 | −0.5 | −0.3 | 79.5 | 39 | 56 |
| Ex. 7 | 20.0 | 18.5 | −0.3 | −0.6 | 80.9 | 38 | 57 |
| Ex. 8 | 19.9 | 18.4 | −0.3 | −0.9 | 79.8 | 37 | 57 |
| Ex. 9 | 20.5 | 18.1 | −0.4 | −0.5 | 81.0 | 37 | 56 |
| Ex. 10 | 21.0 | 18.5 | −0.3 | −0.5 | 79.5 | 37 | 57 |

As described hereinbefore, the magnetite particles of the present invention are improved in magnetic properties with a good balance without detriment to the degree of blackness. Further, they are improved in flowability which is otherwise poor due to agglomeration thereof and are hence suitable as a powdery material for an electrostatic copying magnetic toner and as a black pigment powder for a paint.

What is claimed is:

1. Magnetite particles characterized in that they have surfaces each covered with a thin film of iron-zinc oxides and have a saturation magnetization of at least 79 emu/g, a degree of blackness (L) of at most 19.5 as measured with a differential colorimeter, and an oil absorption of at least 30 ml/100 g as measured according to JIS K 5101.

2. Magnetite particles characterized in that they have surfaces each covered with a thin film of iron-zinc oxides and further covered thereon with a thin film of iron-silicon oxides and have a saturation magnetization of at least 79 emu/g, a degree of blackness (L) of at most 19.5 as measured with a differential colorimeter, an oil absorption of at least 30 ml/100 g as measured according to JIS K 5101, and a spatula angle of at most 60°.

3. A process for preparing magnetite particles which comprises mixing a solution of a ferrous salt as the main component with an aqueous solution of an alkali in an amount at least equivalent to that of iron, subjecting the resulting mixed solution to a first oxidation reaction while keeping the residual sodium hydroxide concentration of the mixed solution at a level of 1 to 3 g/l, adding, after the end of said first oxidation reaction, a ferrous salt containing zinc in such an amount as to obtain a Zn/Fe molar ratio of 0.2 to 1.8% based on the whole magnetite particles, adjusting the pH of the reaction solution to 6.0 to 9.0 and then effecting a second oxidation reaction.

4. A process for preparing magnetite particles which comprises mixing a solution of a Ferrous salt as the main component with an aqueous solution of an alkali in an amount at least equivalent to that of iron, subjecting the resulting mixed solution to a first oxidation reaction while keeping the residual sodium hydroxide concentration of the mixed solution at a level of 1 to 3 g/l, adding, after the end of the first oxidation reaction, a ferrous salt containing zinc in such an amount as to obtain a Zn/Fe molar ratio of 0.2 to 1.8% based on the whole magnetite particles, adjusting the pH of the reaction solution to 6.0 to 9.0, subjecting the reaction solution to a second oxidation reaction, subsequently adding to the reaction solution a ferrous salt containing a silicate in such an amount as to obtain an Si/Fe molar ratio of 0.4 to 2.0% based on the whole magnetite particles, adjusting the pit of the reaction solution to 6.0 to 9.0, and then subjecting the reaction solution to a third oxidation reaction.

* * * * *